Feb. 19, 1946.  F. P. MILLER  2,395,288
INSERTED BLADE CUTTER
Filed June 30, 1943
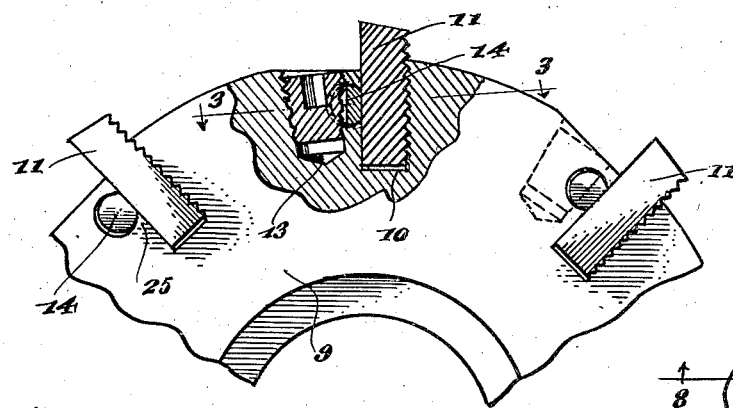
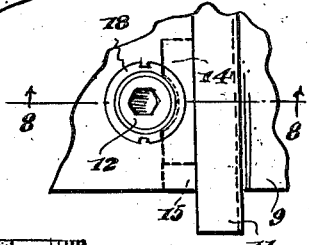
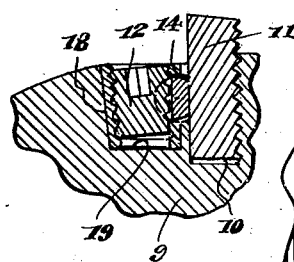
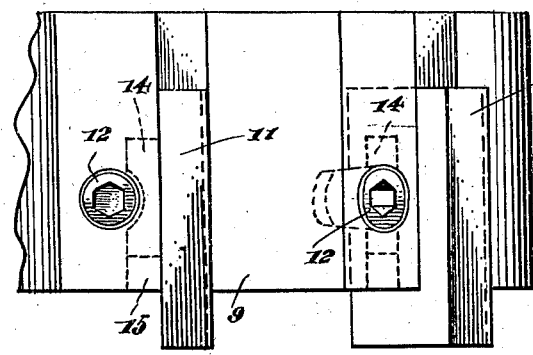
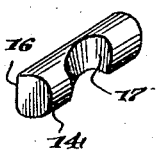
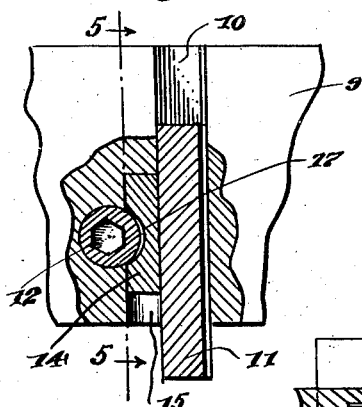
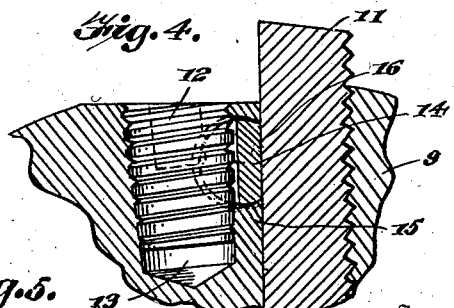
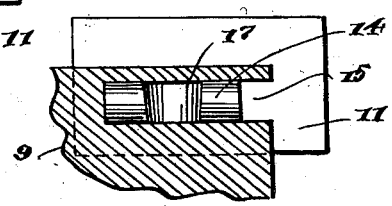
Inventor
FRANK P. MILLER

Patented Feb. 19, 1946

2,395,288

UNITED STATES PATENT OFFICE 2,395,288

INSERTED BLADE CUTTER

Frank P. Miller, Meadville, Pa.; Robert W. Thomas and Florence G. Miller, executors of said Frank P. Miller, deceased, assignors to Frank W. Thomas, Meadville, Pa.

Application June 30, 1943, Serial No. 492,930

4 Claims. (Cl. 29—105)

This invention relates to rotary cutters of the inserted blade type in which the blades are locked in position by means of screws bearing on wedge members which in turn bear on the adjacent blades. The use of wedge members between the locking screw and blade is desirable because of the increased bearing contact thus afforded for the application of holding pressure, but such members are readily susceptible to displacement and loss unless retention means is provided to insure that they shall remain in position.

An object of the invention is to provide a novel assembly of locking screw and wedge member by which dislodgment of the wedge is prevented by engagement with the screw.

Another object is to provide a novel wedge member for use in association with locking screws in rotary cutters, whereby distortion and misalignment of the wedge is prevented when pressure is applied by the locking screw.

A further object is to provide maximum bearing surface both between the wedge and the blade and between the locking screw and the wedge.

Other objects will be apparent to those skilled in the art.

In the accompanying drawing:

Figure 1 is a fragmentary face view, partly in section, of a cutter equipped with the invention.

Figure 2 is a top plan view thereof.

Figure 3 is a section taken on line 3—3 of Figure 1.

Figure 4 is an enlarged sectional view similar to Figure 1 but with the locking screw shown in elevation.

Figure 5 is a section taken on the line 5—5 of Figure 3.

Figure 6 is a perspective view of the wedge member.

Figure 7 is a fragmentary plan view of a cutter having an alternative arrangement of locking screw.

Figure 8 is a section taken on the line 8—8 of Figure 7.

The structural details of the invention comprise a cutter body 9 provided with the usual blade receiving slots 10 for holding the blades 11 which are serrated on their trailing faces for engagement with serrations on the back wall of the slots in a manner well known to the art. A locking screw 12 is threaded into a threaded receiving socket 13 in advance of each blade with the axis of each socket inwardly convergent to the plane of its adjacent blade. The screw is tapered to impart a wedging action against a wedge member 14 housed in the body of the cutter between the screw and blade.

Preferably, but not necessarily, both the locking screw and its socket are tapered in the manner disclosed in my prior United States Patent No. 2,128,571, of August 30, 1938; that is, the pitch line of the socket threads is parallel to the axis of the socket with the bottoms of the threads having flat surfaces increased in area approaching the inner end or bottom of the socket, so that the socket is tapered with respect to the line of the bottom of its threads although the pitch line of the threads is parallel to the axis of the socket. Correspondingly, the pitch line of the locking screw threads is parallel to the screw axis and tapering is effected by increasingly grinding off the tops of the threads as the leading end of the screw is approached.

A longitudinal cylindrical bore 15 is provided in the cutter body between each blade slot and locking screw for reception of the wedge member 14. In this embodiment of the invention the wedge is in the form of a pin that is insertable axially in its bore 15 from the outer face of the cutter body. The wedge pin bore is closed at its inner end to limit inward longitudinal movement of the pin and locate it with respect to the locking screw. The axis of the wedge pin bore 15 is disposed inwardly of the cutter body periphery so that the bore is wholly within the body. This eliminates the possibility of dislodgment of the wedge pin radially of the cutter and strengthens the cutter body adjacent the blade.

The radius of the wedge pin bore is such that the bore opens into the blade slot on one side and into the locking screw socket on the other, as best shown in Figure 4. That side of the wedge adjacent the blade slot is formed with a flat face portion 16 for bearing contact with the blade, while the other side is provided at its mid-portion with a tapered groove 17 to register with and form a part of the bore of the locking screw socket. The depth of the groove is uniform from end to end and its bottom is parallel to the plane of the blade, but its radius of curvature is slightly less than that of the screw socket, as shown in Figure 3. Also, the diameter of the wedge pin 14 is slightly less than that of its bore 15. This arrangement permits a limited lateral shifting of the pin within its bore under wedging action of the locking screw. The axis of the wedge pin is, however, sufficiently far in advance of the blade slot to provide a radius which prevents movement of the wedge pin in its entirety laterally into the blade slot when the blade is removed.

In service, as the locking screw is advanced in its socket it is forced laterally into bearing contact with the groove 17 of the wedge pin with the flat tops of the screw threads providing relatively large bearing surfaces that engages the side walls of the groove 17 without contacting its bottom. Thus the lateral or clamping thrust of the screw is never directed through the thinnest portion of the wedge pin but is instead distributed equally over the side edges of the groove. By virtue of this arrangement the pin 14 cannot buckle or become distorted at its center and is, in fact, longitudinally reinforced. The full wedging effect of the locking screw is distributed uniformly over the wedge pin so that its flat face portion 16 is fully contacted with the blade over the entire length of the wedge.

It will be apparent that so long as the screw 12 is positioned in its socket its engagement with the groove 17 of the wedge pin prevents axial movement of the pin within its bore, so the pin is locked against removal. Also, even though the blade be removed from the slot the pin cannot drop laterally into the slot as its diameter is too large to allow it to pass through the slot wall aperture.

In the embodiment of the invention illustrated in Figures 7 and 8 the same arrangement of locking screw and wedge pin is employed, but instead of the screw 12 being threaded directly into the body of the cutter it engages a socket bushing 18 that is seated in a cylindrical socket recess 19 provided in the body of the cutter. The bushing 18 has hardened threads which are vastly more durable and less susceptable to damage than threads tapped directly in the body of the cutter.

The invention herein shown and described is capable of variation in structural detail and arrangement, and it is to be understood that any such variations desired may be made that are comprised within the scope of the invention as claimed.

I claim:

1. In an inserted blade cutter, a body having a blade slot therein, a blade in the slot, a locking screw socket provided in the cutter at one side of the blade, said socket being tapered on an axis inwardly convergent to the plane of the blade, the cutter body between said socket and slot being provided with a cylindrical bore opening from one face of the cutter and closed at its inner end, said bore intersecting the screw socket at one side and opening into the blade slot at the other, a pin insertable in said bore and of slightly smaller diameter than that of the bore whereby the pin may be shifted laterally in the bore, said pin having a flat portion bearing on the blade through the opening in the slot wall, a tapered groove in said pin for registering with said screw socket, the radius of said groove being smaller than the radius of the socket, and a locking screw in threaded engagement with said socket for bearing on the side edges of the pin groove to wedge the pin against the blade as the screw is advanced inwardly of the socket.

2. In an inserted blade cutter, a body having a blade slot therein, a blade in the slot, a recess in the body at one side of the blade, the body of the cutter between said recess and slot having a bore opening at one side into the blade slot and at the other side intersecting the recess, a pin in said bore and adapted for limited lateral movement therein, said pin having a tapered groove in registry with the recess, an internally threaded bushing in said recess and having an opening registering with the pin groove, the radius of the pin groove being slightly less than that of the bushing, and a tapered locking screw threaded in said bushing to bear upon the side edges of the pin groove and wedge the pin laterally against the blade as the screw is advanced toward the bottom of the bushing.

3. In an inserted blade cutter, a body having a blade slot therein, a blade in said slot, a tapered screw-receiving socket in said body and spaced from said slot, the body between said slot and said socket being provided with a bore opening into the blade slot at one side and into the screw-receiving socket at the other side, an elongated wedge member insertable longitudinally in said bore, said bore being substantially the shape of said wedge member but sufficiently enlarged to allow limited lateral movement of said wedge member therein and the opening of said bore into said blade slot being restricted to such an extent as to prevent the lateral escape of said wedge member from said bore in the absence of said blade, and a tapered screw in said socket and engaging said wedge member for moving the same laterally into binding engagement with said blade.

4. In an inserted blade cutter, a body having a blade slot therein, a blade in said slot, a socket in the body at one side of the blade slot and spaced therefrom, the body of the cutter between said socket and blade slot being provided with a bore opening at one side into the blade slot and at its other side into the socket, a wedge member in said bore, said bore being substantially the shape of said wedge member but sufficiently enlarged to allow limited lateral movement of said wedge member therein and the opening of said bore into said blade slot being restricted to such an extent as to prevent the lateral escape of said wedge member from said bore in the absence of said blade, and a locking element in said socket for bearing upon and forcing said wedge member laterally into binding engagement with said blade.

FRANK P. MILLER.